United States Patent
Lee et al.

(10) Patent No.: US 7,614,816 B2
(45) Date of Patent: Nov. 10, 2009

(54) DEVICE FOR PREVENTING BALL AND SOCKET JOINT FROM ROLLING

(75) Inventors: Hwan-Gyu Lee, Seongdong-gu (KR); Sang-Youn Lee, Seo-gu (KR)

(73) Assignee: Agency for Defense Development (KR)

( * ) Notice: Subject to any disclaimer, the term of this patent is extended or adjusted under 35 U.S.C. 154(b) by 100 days.

(21) Appl. No.: 11/590,924

(22) Filed: Nov. 1, 2006

(65) Prior Publication Data
US 2007/0117438 A1   May 24, 2007

(30) Foreign Application Priority Data
Nov. 2, 2005   (KR) .................. 10-2005-0104045

(51) Int. Cl.
   *F02K 9/84*   (2006.01)
   *F16L 27/00*   (2006.01)
(52) U.S. Cl. ............... 403/116; 403/59; 403/61; 403/80; 285/261; 239/587.4
(58) Field of Classification Search .......... 403/57, 403/59, 61, 80, 87, 112, 113, 114, 116; 464/120; 239/265.35, 587.4; 60/232; 285/261, 264
See application file for complete search history.

(56) References Cited

U.S. PATENT DOCUMENTS

| | | | | |
|---|---|---|---|---|
| 1,334,154 A | * | 3/1920 | Harrison | .................. 464/120 |
| 1,444,864 A | * | 2/1923 | Biederman | ............... 403/116 |
| 2,919,546 A | * | 1/1960 | Constant | .............. 239/265.35 |
| 3,048,011 A | | 8/1962 | Tumavicus | |
| 3,142,153 A | | 7/1964 | Hensley | |
| 3,179,447 A | * | 4/1965 | Parr et al. | ................ 285/264 |
| 3,406,534 A | * | 10/1968 | Chapper | |
| 4,114,401 A | * | 9/1978 | Van Hoose | ............... 464/120 |
| 4,180,285 A | * | 12/1979 | Reneau | .................. 285/261 |
| 4,435,993 A | * | 3/1984 | Scott | |
| 4,506,832 A | | 3/1985 | Faupell | |
| 5,816,926 A | | 10/1998 | Lynch et al. | |
| 6,146,280 A | * | 11/2000 | Pulford, Jr. | ............. 464/120 |
| 6,948,307 B2 | * | 9/2005 | Berdoyes et al. | ............ 60/232 |
| 7,303,210 B2 | * | 12/2007 | Baxter et al. | |

FOREIGN PATENT DOCUMENTS

JP   60065909 A   *   4/1985

* cited by examiner

*Primary Examiner*—Daniel P Stodola
*Assistant Examiner*—Ernesto Garcia
(74) *Attorney, Agent, or Firm*—Banner & Witcoff, Ltd.

(57) ABSTRACT

An anti-rolling device of a ball and socket joint prevents the rolling movement of a moving body coupled to the ball effectively without hindering omni-directional tilt rotational movement of the moving body, i.e. a moving part relative to the socket, a fixing part. The anti-rolling device comprises: a bracket on the moving part that is fixed to the circumference of the moving body; a guide channel whose upper part is pivoted to the bracket on the moving part; a sliding bar coupled to the guide channel in a way being possible to be slid thereinto; and a bracket on the fixing part which is mounted on the fixing part and coupled with the lower part of the sliding bar.

1 Claim, 2 Drawing Sheets

DEVICE FOR PREVENTING BALL AND SOCKET JOINT FROM ROLLING

BACKGROUND OF THE INVENTION

The present invention relates to an anti-rolling device of a ball and socket joint. In a ball and socket joint, the ball can be rotated in every direction on the center point of the socket and the ball. However, when it is applied to a hinge of a rocket nozzle for changing the thrust direction, the rolling movement of the moving body coupled to a ball, i.e. nozzle should be restricted.

A method for controlling a flight vehicle is thrust vectoring that is a function for changing the direction of thrust generated from a rocket motor nozzle. For such thrust vectoring of the nozzle, a ball and socket joint is employed as a mechanical hinge.

Specifically, a rocket motor nozzle part is comprised of a socket mounted on the dome area of a combustion, chamber, a ball which is mounted on the socket in a way of being rotatable on the center point of the socket, a nozzle which is coupled to the ball. Between the circumference of the nozzle as a moving body and the fixing part, two actuators are mounted to achieve the thrust vectoring of the nozzle. Further, for controlling the omni-directional tilt rotational movement of the nozzle, an anti-rolling linkage is generally used, and as an example of such technique, a technique disclosed in U.S. Pat. No. 4,506,832 can be mentioned.

However, in order to constrain the rolling movement of the nozzle by practicing the above-mentioned prior art, the center of movement in the lower pin of the linkage should be in the horizontal plane of the nozzle which passes through the center of the ball in extended line, thereby it causes difficulty in placing the linkage. When the lower pin center is not in position, thrust vectoring could be realized by special algorithms, but the ball the some roll motion against the socket for omni-directional thrust vectoring.

SUMMARY OF THE INVENTION

Concerning these conventional problems, the present invention has been designed. The object of the present invention is to provide an anti-rolling device of a ball and socket joint, which can prevent the rolling movement of a moving body coupled to the ball effectively without hindering omni-directional tilt rotational movement of the moving body coupled to the ball, i.e. a moving part relative to the socket, a fixing part.

BRIEF DISCRIPTION OF DRAWING

DETAILED DESCRIPTION OF THE INVENTION

In order to achieve aforementioned object, the present invention provides an anti-rolling device of a ball and socket joint, by comprising: a bracket on the moving part that is fixed to the circumference of the moving body; a guide channel of which one side of the upper part is pivoted to the bracket on the moving part; a sliding bar coupled to the guide channel in a way being possible to be slid thereinto; and a bracket on the fixing part which is mounted on the fixing part and coupled with the lower part of the sliding bar in a way of allowing the sliding bar to be alternately slanted to the right and the left as being slid along the guide channel.

The anti-rolling device of a ball and socket joint is further characterized in that the bracket on the moving part has a pair of protruded supporting parts which is extended upward and has long holes in lengthwise direction formed thereon; the sliding bar has connecting pins on each side of the lower part thereof, which are inserted into each long hole and slid along the long hole; and on the bottom of the bracket of the fixing part, a curved protrusion is formed, which has a curvature that the center of the protrusion is located on the height (h) corresponding to the center of the ball and facilitates the simultaneous sliding and slanting movement of the lower part of the sliding bar, to the right and the left direction.

Figure 1:
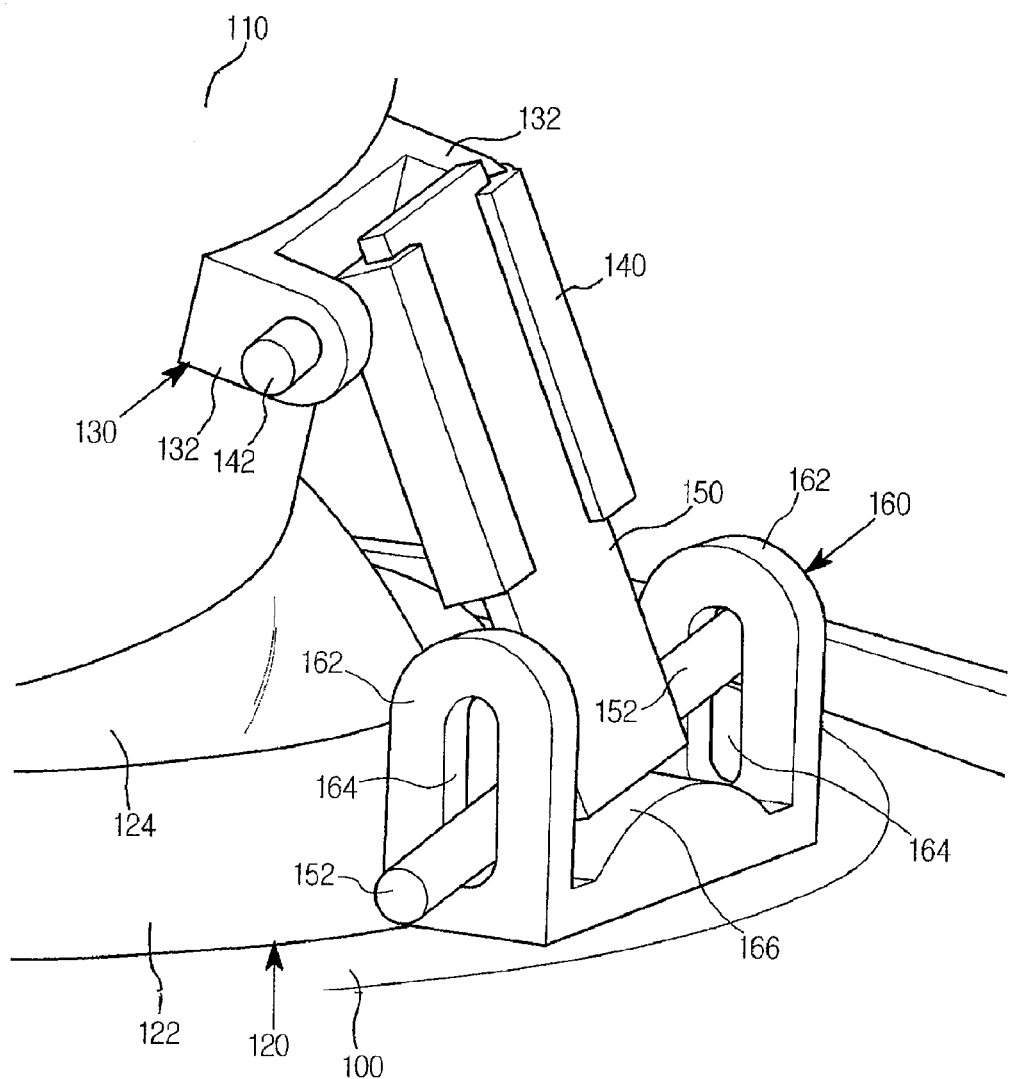
FIG. 1 is a perspective view illustrating an anti-rolling device of a ball and socket joint according to the present invention.

FIG. 1 illustrates one example of an anti-rolling device of a ball and socket joint according to the present invention, which shows that, for instance when being applied to the rocket motor nozzle, it restricts only the rolling movement without hindering the omni-directional tilt rotational movement, i.e. omni-directional thrust vectoring.

The anti-rolling device of a ball and socket joint according to the present invention interconnects a fixing part (100) for example functioned as a dome of a combustion chamber with a moving body (110) functioned as a nozzle by being coupled to a ball (124) of a ball and socket joint (120) mounted on the fixing part (100) so as to only restrict rolling movement of the moving body (110) without hindering omni-directional thrust vectoring of the moving body (110), wherein the ball (124) is inserted in a socket (122) in a way of being rotatable to optional direction.

In order to perform that function, the anti-rolling device of a ball and socket joint according to the present invention comprises a bracket on the moving part (130), a guide channel (140), a sliding bar (150) and a bracket (160) on the fixing part (100).

The bracket on the moving part (130) is mounted on the circumference of moving body (110), and comprises protruded supporting parts (132) on each side, which are extended from the moving body (110) to outward direction.

The guide channel (140) is pivoted to the bracket on the moving part (130) on one side of its upper part, wherein the pivoting to the bracket on the moving part (130) is achieved by having connecting pins (142) which are formed on side of the upper part, and hinged to one side of the protruded supporting parts (132) of the bracket on the moving part (130). Further, the connecting pins (142) are preferably designed to pass through a part of the guide channel (140), but it may be formed as one unit with the guide channel (140) if it can be assembled.

The sliding bar (150) is coupled to the guide channel (140) in a way being possible to be slide thereinto, and is also coupled to the bracket (160) on the fixing part (100) in a way of allowing the lower part of the sliding bar to be slantly slid simultaneously to the right and the left as being slid along the guide channel (140).

The bracket (160) on the fixing part (100) comprises a pair of protruded supporting parts (162) which is extended upward and has long holes (164) and the sliding bar (150) has connecting pins (152) on each side of lower part thereof, which are inserted into each long hole (164) and slid along the long hole (164). Further, on the bottom of the bracket (160) of the fixing part (100), a curved protrusion (166) is formed, which has a curvature that the center of the protrusion arc is located on the height (h) corresponding to the center of the ball (124)

Figure 2:
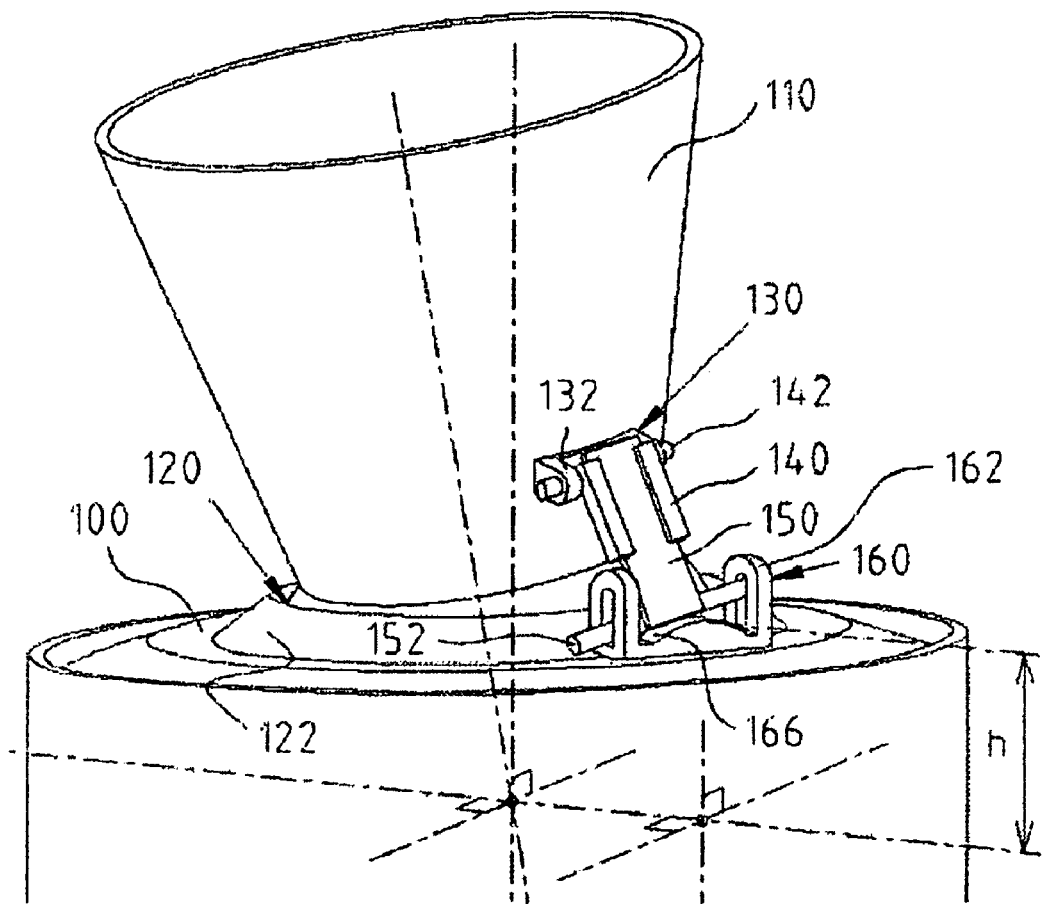
FIG. 2 is another perspective view illustrating the anti-rolling device of FIG. 1 showing height h.

(as shown in FIG. 2) and facilitates the sliding and slanting movement of the lower part of the sliding bar (150), to the right and the left direction.

Therefore, the sliding bar (150) can adjust the gradient of the guide channel (140) by sliding along the guide channel (140), while adjusting the degree of tilt to the right and left of the guide channel (140) as the lower part of the sliding bar is moved on the curved protrusion (166) to perform a behavior of being tilted to right and left. Therefore, tilt rotation of the moving body (110) and the ball (124) is not hindered, but rolling movement is effectively restricted.

Next, the mechanism of the anti-rolling device of a ball and socket joint with above-described constitution according to the present invention is described.

When a force causing rolling is applied to the moving body (110), the connecting pins (152) of the sliding bar (150) is inclined to rotate about the center axis of the ball (124), however rolling is not possibly occurred due to two long holes (164) located with a certain interval.

Therefore, it becomes possible to restrict the rolling movement effectively, while allowing the omni-directional tilt rotational movement of the moving body (110) and the ball (124) without any obstruction.

INDUSTRIAL APPLICABILITY

As it has been described so far, by using the anti-rolling device of a ball and socket joint according to the present invention, it becomes possible to prevent the rolling movement of a moving body (110) coupled to the ball (124) in effective way, without hindering omni-directional tilt rotational movement of the moving body (110) coupled to the ball, thereby allowing precise control of the moving body (110).

Further, unlike the conventional linkages, it provides a compact structure owing to the use of a sliding bar (150), a guide channel (140) and a curved protrusion (166) which facilitates the sliding and slanting movement of the sliding bar (150), thereby providing additional advantage in the aspect of the space utilization in system designing.

What is claimed is:

1. An anti-rolling device, interconnecting a fixing part having a socket and a moving body coupled to a ball located in the socket, to prevent rolling movement of the moving body without hindering omni-directional tilt movement of the movement body, comprising:

a first bracket fixed to the circumference of the moving body;

a guide channel having one side pivotally connected to the first bracket on the moving body;

a sliding bar coupled to the guide channel and configured to slide in the guide channel; and a second bracket mounted on the fixing part and coupled with a lower part of the sliding bar;

wherein the second bracket has a pair of protruded supporting parts having long holes thereon;

wherein connecting pins on each side of the lower part of the sliding bar are inserted into each long hole to slide along the long holes and to allow the sliding bar to be slanted sideways relative to the second bracket while sliding along the guide channel; and wherein a bottom of a the second bracket has a curved protrusion having a curvature such that a center of the curved protrusion is located on a height relative to the center of the ball to facilitate sliding and slanting movement of the pins.

* * * * *